United States Patent [19]

Barrett

[11] 4,092,540
[45] May 30, 1978

[54] RADIOGRAPHIC CAMERA WITH INTERNAL MASK

[75] Inventor: Harrison H. Barrett, Tucson, Ariz.

[73] Assignee: Raytheon Company, Lexington, Mass.

[21] Appl. No.: 735,476

[22] Filed: Oct. 26, 1976

[51] Int. Cl.² .............................................. G01T 1/20
[52] U.S. Cl. ............................................... 250/363 S
[58] Field of Search ................................... 250/363 S

[56] References Cited

U.S. PATENT DOCUMENTS

| 3,748,470 | 7/1973 | Barrett ............................. | 250/363 S |
| 3,784,819 | 1/1974 | Martone et al. .................. | 250/363 S |

*Primary Examiner*—Davis L. Willis

*Attorney, Agent, or Firm*—David M. Warren; Joseph D. Pannone; Milton D. Bartlett

[57] ABSTRACT

A radiographic camera having a scintillator and an array of photodetectors positioned for viewing a common region of the scintillator, and wherein a mask system is interposed between the scintillator and the array of photodetectors for increasing the resolution of an image produced by the camera. The mask system has a pair of mask plates which are spaced apart and have similar formats of opaque materials thereon. The mask system provides a more rapid variaton in the intensity of light received at a photodetector as a function of locations of scintillations on the scintillator. A reference signal source providing a signal pattern in accordance with the intensity variation is utilized for decoding shadows cast by the mask to produce the image.

8 Claims, 6 Drawing Figures

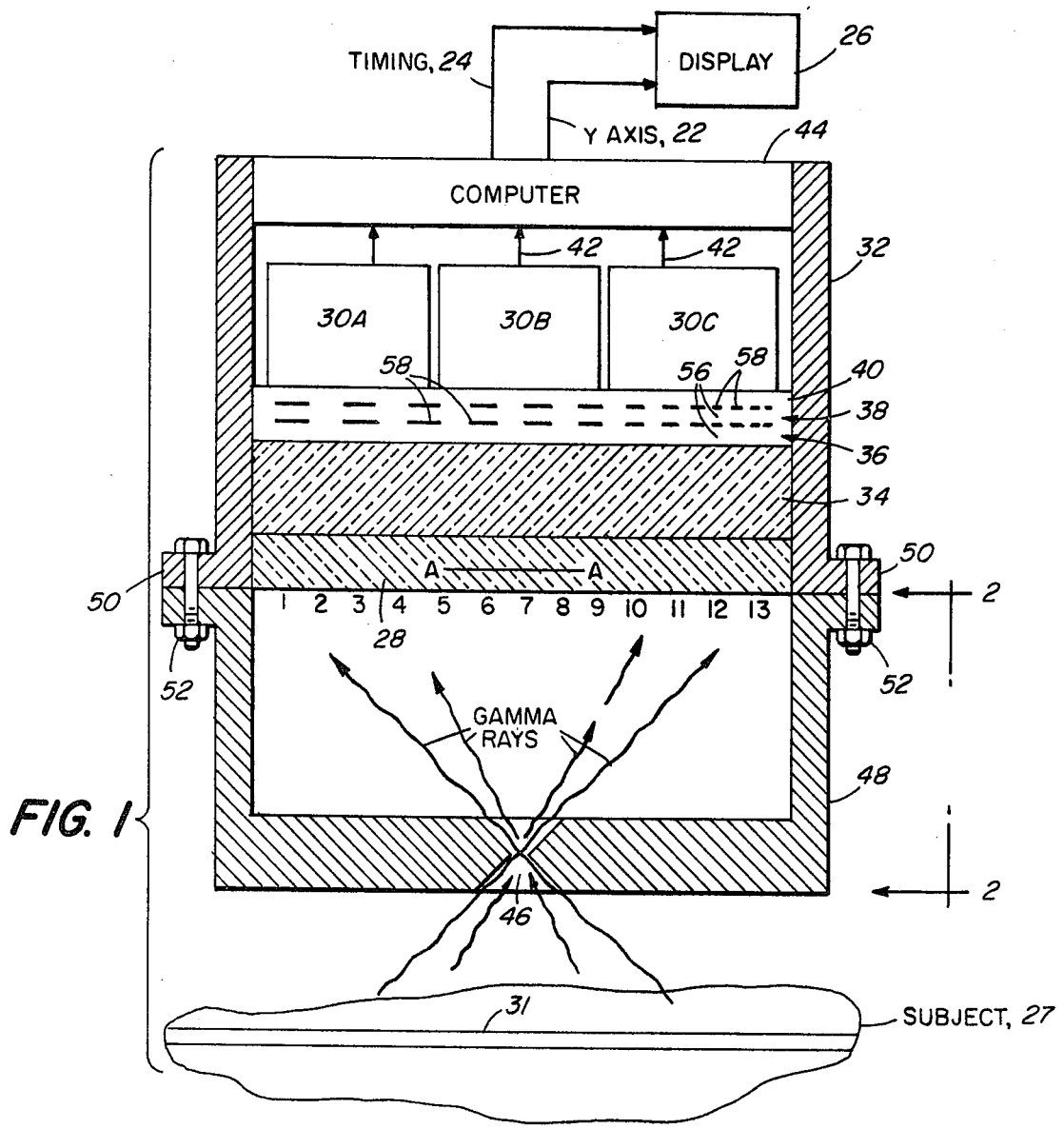
FIG. 1
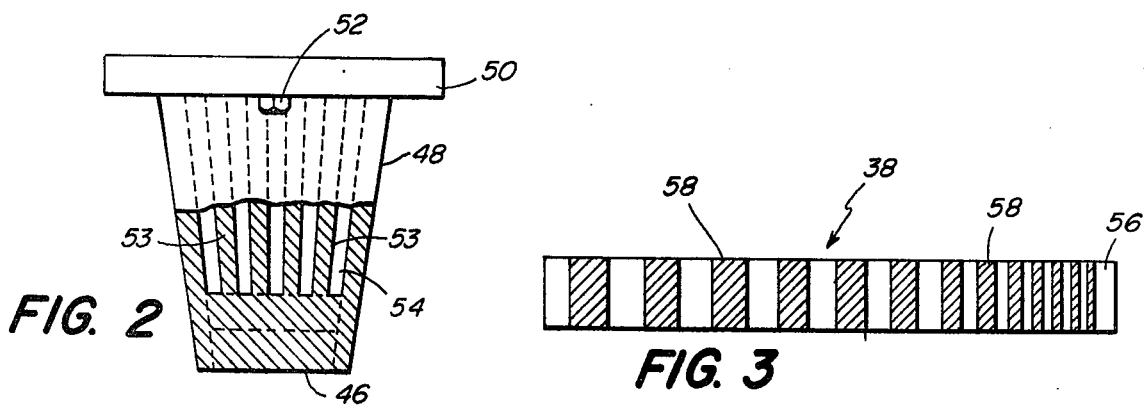
FIG. 2
FIG. 3

RADIOGRAPHIC CAMERA WITH INTERNAL MASK

BACKGROUND OF THE INVENTION

Radiographic cameras such as that disclosed in the U.S. Pat. No. 3,011,057 which issued in the name of H. O. Anger on Nov. 28, 1961, having a scintillator and an array of photodetectors for viewing scintillations thereof, are utilized for forming images of radioactive subjects by use of a pinhole aperture or a collimator as disclosed in the aforementioned Anger patent, and also by a mask positioned between the subject and the camera as disclosed in the U.S. Pat. No. 3,748,470 which issued in the name of H. H. Barrett on July 24, 1973. The signals of the photodetectors of the camera are combined by a computer type circuit in an operation based on the relative intensities of a scintillation as viewed by the array of photodetectors, the intensities varying in accordance with the distances of a scintillation from each of the photodetectors. The rate of change of scintillation intensity as a function of the position of a scintillation relative to a photodetector is related to the resolution of the camera such that an increased rate of change produces an increased resolution.

A problem arises in that medical technology requires ever increasing resolution to provide finer detail in images of subjects. However, the aforementioned rate of change of scintillation intensity is limited by the physical sizes of the photodetectors, and a minimum spacing between them and the scintillator which permits the viewing of a common area of the scintillator by a plurality of photodetectors. Thus, the resolution is limited by the physical structure of the camera.

SUMMARY OF THE INVENTION

The aforementioned problem is overcome and other advantages are provided by a radiographic camera which in accordance with the invention, provides increased resolution by a mask system positioned between the scintillator and the array of photodetectors. In a preferred embodiment of the invention, the mask system is formed by a pair of masks in the form of plates and having similar formats of opaque material thereon. A mask plate is readily fabricated from a glass plate by depositing an opaque paint thereon in a prescribed format such as a plurality of a series of parallel stripes. The mask plates are spaced apart, there being a front plate and a back plate, so that the light of a scintillation casts a shadow of one mask pattern on the front plate against the second mask pattern on the back plate to produce a combined shadow of the two mask patterns upon the photodetectors, the combined shadow having the form of a Moire pattern. A shift in position of scintillations within the scintillator results in a more rapid change in the intensity of light impinging upon a photodetector than occurs in the absence of the mask system. The Moire shadows cast sequentially upon the array of photodetectors by sequentially occurring scintillations are transformed into an image of the subject by use of a source of reference signals for the photodetectors. Each reference signal has a waveform resembling the variation in total transmission of the mask pattern with scintillation position. The reference signals of a plurality of detectors are utilized to resolve ambiguities in a scintillation position associated with one reference signal.

BRIEF DESCRIPTION OF THE DRAWINGS

The aforementioned aspects and other features of the invention are explained in the following description taken in connection with the accompanying drawings wherein:

FIG. 1 is a sectional view of a radiographic camera in accordance with the invention, the camera providing a line image of a subject;

FIG. 2 is a side view, partially cut away, of a collimator taken along lines 2—2 of FIG. 1, the collimator being affixed to the camera of FIG. 1;

FIG. 3 is a plan view of a mask plate of a mask system positioned between a scintillator and an array of photodetectors shown in FIG. 1;

DESCRIPTION OF THE PREFERRED EMBODIMENT

Figure 4:
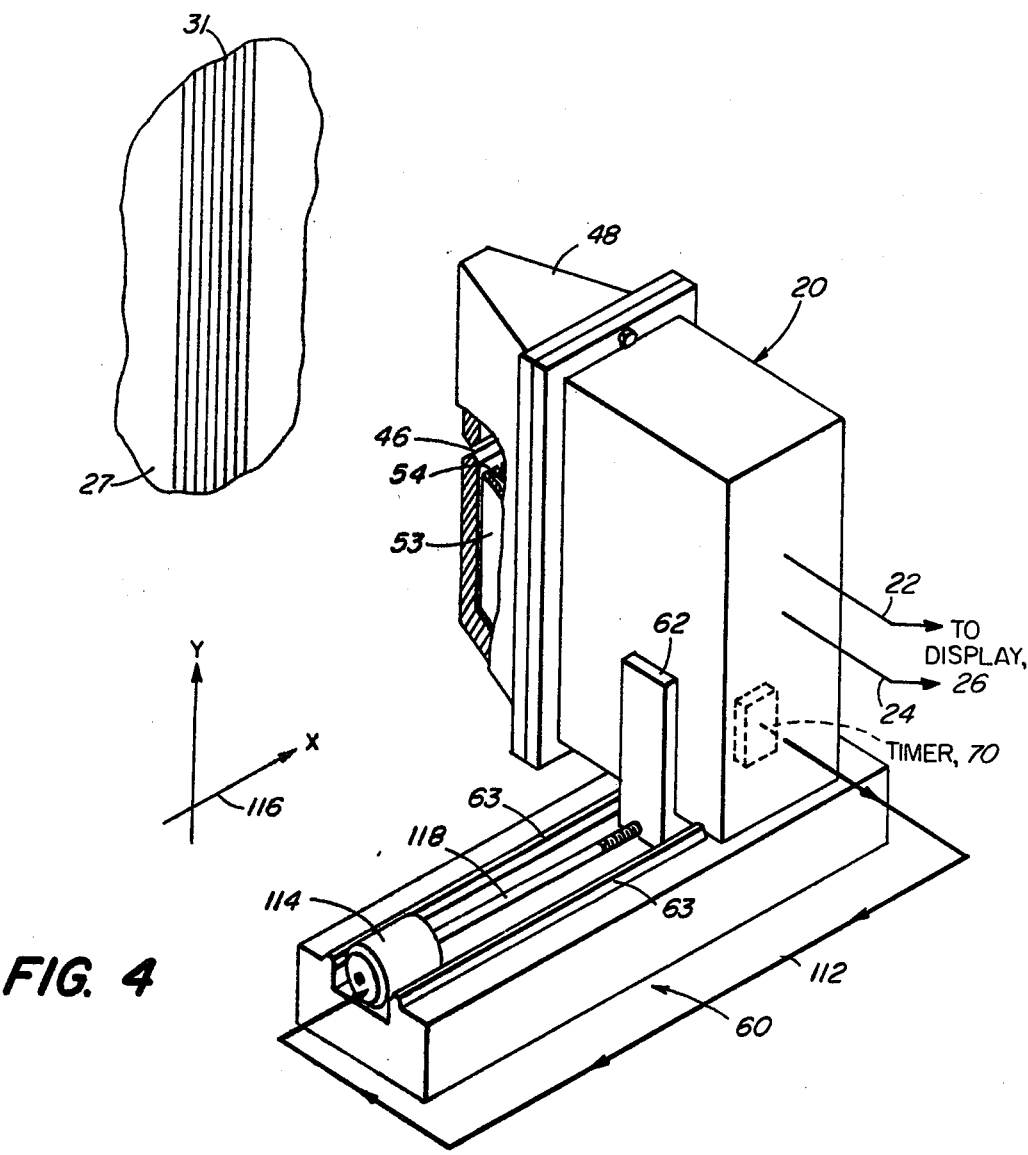
FIG. 4 shows a scanner for displacing the camera of FIG. 1 sideways to form images of successive strips of the subject.

Referring now to FIG. 1, there is seen a sectional view of a radiographic camera 20 coupled via lines 22 and 24 to a display 26 which portrays the image of a subject 27 produced by the camera 20. The camera 20 includes a scintillator 28 and photodetectors 30, individual ones of which are further identified by the legends A, B and C, as taught in the aforementioned Anger patent. The three photodetectors 30 are positioned side by side for forming a one-dimensional image of a strip 31 of the subject 27, it being understood that more than three photodetectors may be utilized for providing increased resolution to the image. A case 32 supports the scintillator 28, a transparent spacer plate 34, a front mask 36, a rear mask 38, and a spacer plate 40. Each of the photodetectors 30 is coupled via a line 42 to a computer 44 situated in the back portion of the case 32. An aperture 46 having the shape of a narrow slit is centered in a collimator 48 which is positioned in front of the scintillator 28 and is secured to the case 32 by flanges 50 and bolts 52. The subject 27 is placed in front of the aperture 46 to be imaged by the camera 20.

Referring now to FIG. 2, there is seen a side view of the collimator 48, the view being partially cut away to show a set of plates 53 defining longitudinal slots 54 for passing only such rays of radiation as are emitted from the narrow strip 31 of FIG. 1. The strip 31 is parallel to the slots 54 and perpendicular to the aperture 46. Also seen in FIG. 2 are the flange 50 and one of the bolts 52 for attaching the collimator 48 to the camera 20 of FIG. 1.

Referring now to FIGS. 1 and 3, the rear mask 38 is seen to comprise a glass plate 56 which is transparent to the light of scintillations emitted by the scintillator 28 and supports regions 58 which are opaque to the light of the scintillations. The opaque regions 58 may be deposited on the glass plate 56 by photo-etching techniques. The opaque regions 58 are shown as parallel stripes of monotonically decreasing width and spacing. In a preferred embodiment of the invention, the widths and spacings vary in the manner of the widths and spacings of the successive rings of a Fresnel mask utilized in optics, the rear mask 38 thus being a portion of a one-dimensional Fresnel plate. Other patterns for the arrangement of the opaque regions 58 may be utilized such as a width and a spacing which varies quadratically. Also, the width of an opaque region 58 may be increased or decreased, by a small amount such as 10% to 20%, relative to the width of the adjacent transparent region from the relationship of substantial equality shown in FIG. 3. The front mask 36 has a pattern of opaque regions 58 which is similar to that shown for the mask 38. If desired, the width of the opaque regions 58 of the front mask 36 may be made slightly smaller than the corresponding regions of the rear mask 38 so that a scintillation positioned on the axis of a photodetector 30 of FIG. 1 casts a shadow of the front mask 36 which is in alignment with the edges of the opaque regions of the rear mask 38 for a maximum intensity of received light at the aforementioned photodetector 30. For positions of scintillations at a distance from the aforementioned axis of the photodetector 30, the intensity of the light received at the photodetector 30 is smaller than the aforementioned maximum intensity. Variations of intensity with position of the scintillation on the scintillator 28 of FIG. 1 occur due to the shadowing effect of each of the masks 36 and 38, a reduced intensity occurring when the shadow of the front mask 36 falls within the transparent regions of the rear mask 38.

Referring now to FIGS. 1 and 4, there is seen a scanner 60 for mechanically scanning the camera 20 by a succession of sidewise displacements to permit imaging of successive strips 31 of the subject 27. The scanner 60 is seen to comprise a bracket 62 for securely holding the camera 20, the bracket 62 being slidably guided along rails 63 in a plane parallel to the subject 27. Also seen in the figure is the collimator 48, the collimator 48 being partially cut away to show the aperture 46 and the aforementioned parallel relationship between the orientation of the slots 54 with the strips 61.

Figure 5:
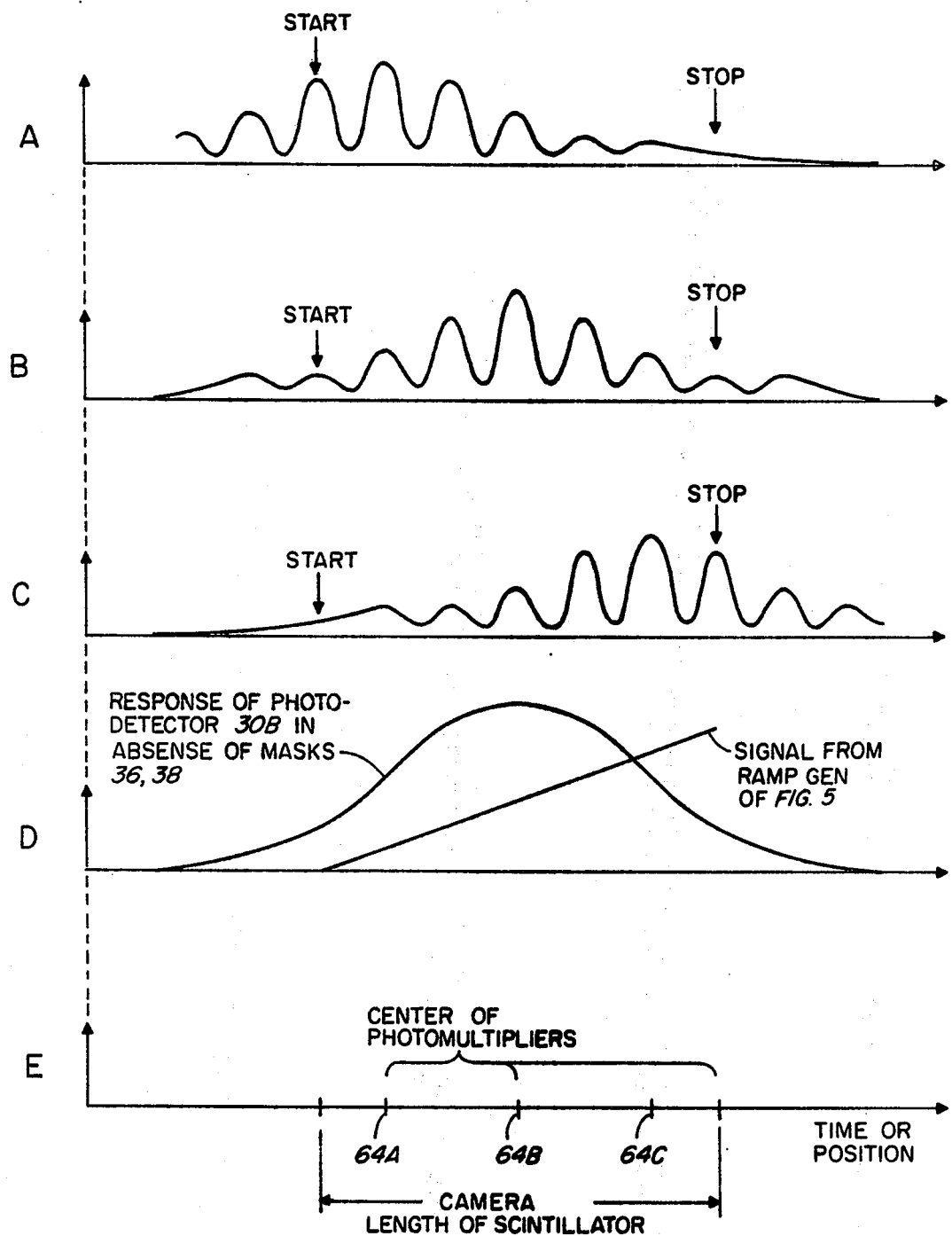
FIG. 5 is a series of graphs showing the intensity of light received by each of the photodetectors of FIG. 1 as a function of the location of a scintillation upon the scintillator of FIG. 1.

Referring now to FIG. 5 there is seen a set of graphs labeled A–E and positioned in registration one above the other to demonstrate the intensities of light received at the photodetectors 30A–C of FIG. 1. Graph E represents position along the scintillator 28 and, in particular, the positions of the centers of the photodetectors 30. The graphs A, B and C correspond respectively to the photodetectors 30A, 30B, and 30C. Graph D, represents the intensity of light received by the photodetector 30B in response to scintillations located at various locations within the scintillator 28 in the absence of the masks 36 and 38.

Referring specifically to graph A of FIG. 5 and also to the detector 30A and the scintillator 28 of FIG. 1, graph A is seen to represent the amplitude of a signal provided by the detector 30A on line 42 as a function of the position of a scintillation within the scintillator 28. When a scintillation occurs along the axis of the photodetector 30A as designated by the mark 64A on graph E, the maximum amplitude of the signal on line 42 is obtained as seen by the peak is graph A. When the scintillation occurs at a point slightly to the left or the right of the mark 64A, then the shadow cast by the front mask 36 overlaps portions of the transparent regions of the mask 38 with the result that light is occluded by both the opaque regions 58 of the front mask 36 and the opaque regions 58 of the rear mask 38 resulting in a minimum amount of signal on line 42. This is seen in the graph A by the decrease in amplitude to either side of the peak of the graph. Graph A is seen to undulate having both high and low values of amplitude, with the undulations tapering off to a low value of amplitude for locations of the scintillation far to the right and left of the mark 64A. The boundaries of the camera 20 are indicated in graph E from which it is seen that, in the case of the photodetector 30A, graph A must be truncated at a point opposite the edge of the camera. Thus, the admissible portions of the graph A produce a non-symmetrical pattern.

Referring now to graph B, it is seen that the shape of the graph is the same as the shape of graph A, except that graph B has been displaced to the right with the center of the graph falling above the mark 64B. Graph B is symmetrical with respect to the axis of the camera. Graph C is seen to be displaced still further, the peak value of the graph occurring opposite the mark 64C. Each of the graphs A, B and C are seen to have the same form except that each is truncated at different points depending on their relative positions with respect to the edges of the camera which are shown in graph E.

Figure 6:
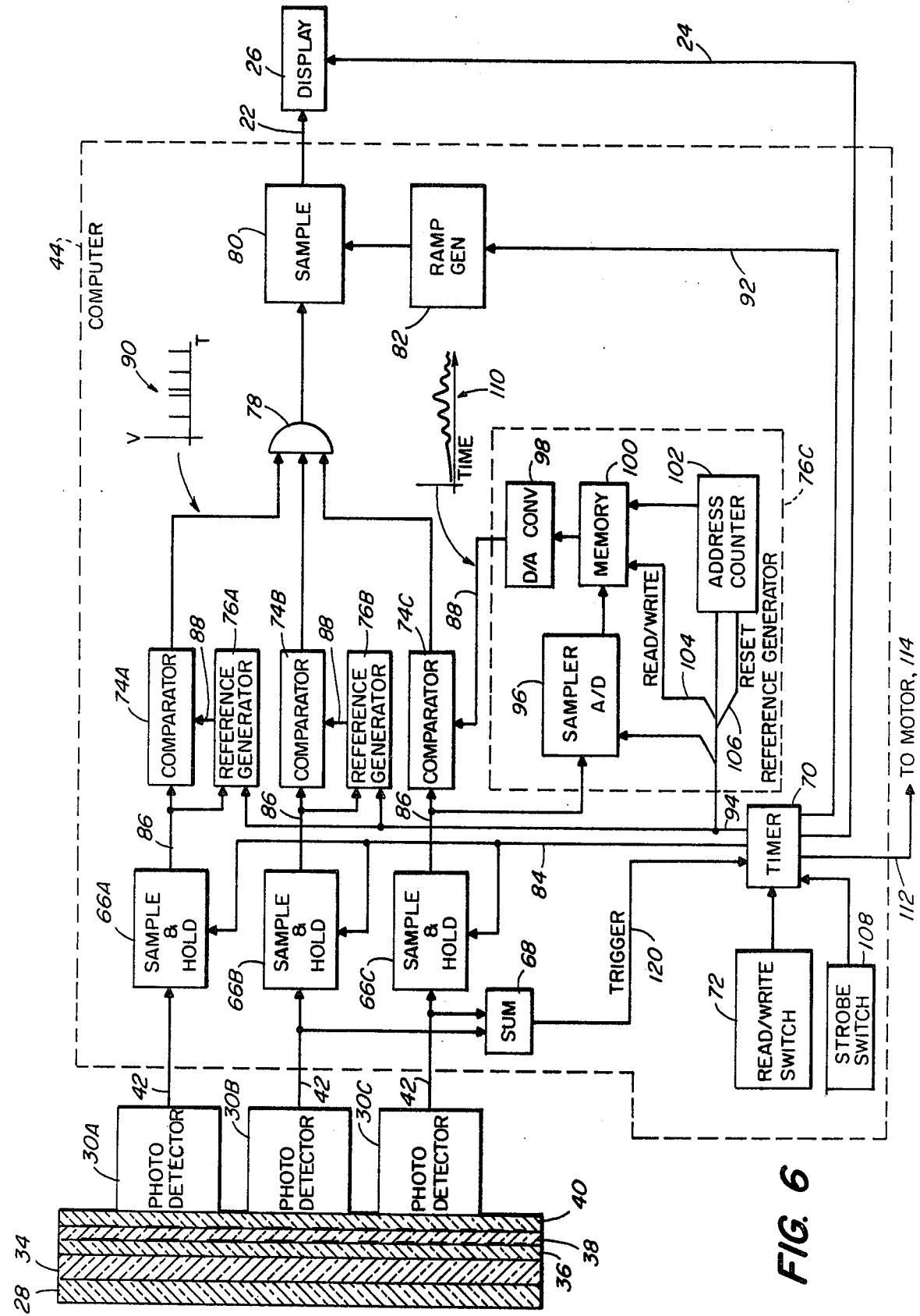
FIG. 6 is a block diagram of a computer of the camera of FIG. 1 utilized in converting the photodetector signals to an image.

Referring now to FIG. 6, there is seen a block diagram of the computer 44 of FIG. 1 and its interconnections via lines 42 to the photodetectors 30 and via lines 22 and 24 to the display 26. The computer 44 comprises a set of sample and hold circuits hereinafter referred to as samplers 66, individual ones of the samplers 66 being coupled to corresponding ones of the photodetectors 30, three such samplers 66 being seen in the figure and being further identified by the suffixes A, B and C. Each of the photo-detectors 30, by way of example, comprises a photomultiplier and pulse shaping circuitry as is described in the U.S. Pat. No. 3,914,611 which issued in the name of K. J. Stout on Oct. 21, 1975. The computer 44 also comprises a summer 68, a timer 70 which is also seen in FIG. 4, a switch 72, comparators 74 with individual ones thereof being further identified by the suffixes A–C, reference generators 76 with individual ones thereof being further identified by the suffixes A–C, an AND gate 78, a sampler 80, and a ramp generator 82. There is one comparator 74 and one generator 76 corresponding to each of the photodetectors 30.

In response to a quanta of incident radiant energy impinging upon the scintillator 28, a scintillation of light emanates from the point of impingement within the scintillator 28 and radiates through the masks 36 and 38 to produce a composite shadow of the masks upon the photodetectors 30, individual ones of the photodetectors 30 receiving different shadow patterns depending on the positional relationship between the individual photodetector and the location of the scintillation. The magnitude of the light in the portion of the light impinging upon an individual one of the photodetectors 30 is converted to an electrical signal appearing on line 42 and having a magnitude corresponding to the amount of light impinging upon the photodetector 30. Thus, each photodetector 30 transmits an electrical signal via line 42 to its corresponding sampler 66 which, in response to timing signals transmitted thereto via line 84 from the timer 70, samples the signal on line 42 and retains the magnitude of that sample during an interval of time, as will be disclosed hereinafter, during which the ramp generator 82 is generating a ramp waveform signal.

As was disclosed previously with respect to FIG. 5, the magnitude of the signal on line 42 from the photodetector 30A has a magnitude in accordance with the position of the scintillation in the scintillator 28 as shown in graph A. It is this magnitude of signal which is sampled and held by the sampler 66A. Similarly, the sampler 66 samples and holds the magnitude of signal disclosed in graph B of FIG. 5, a similar comment applying to the sampler 66C. Thus, the three samplers 66A–C are providing along lines 86 three voltages having magnitudes as given by the graphs A–C of FIG. 5.

It is noted that, for any one of the graphs A–C of FIG. 5, there are a plurality of positions along the scintillator, as represented by graph E, which produce the same magnitude of signal. Thus, the voltage produced by the sampler 66 may represent any one of a plurality of positions along the scintillator 28. Similarly, the voltage produced by the sampler 66B represents a plurality of points on the scintillator 28 from which a scintillation may have occurred, a similar comment applying to the sampler 66C. The comparators 74 and the generators 76 in cooperation with the gate 78 and generator 82 resolve the aforementioned ambiguities in position to provide the single location within the scintillator 28 at which the scintillation occurred.

In operation, the resolution of the foregoing ambiguity of position is accomplished as follows. Each of the reference generators 76 produces a portion of the waveforms depicted in FIG. 5; thus, the generator 76A produces a reference signal depicted in graph A and beginning at the point labeled "start" and terminating at the point labeled "stop"; similarly, the generator 76B produces a reference signal having the waveform of graph B between the points "start" and "stop", and the generator 76C produces a reference signal having the waveform of graph C between the points "start" and "stop". Each comparator 74 compares the amplitude of the signal on line 86 from its corresponding sampler 66 with the amplitude of a reference signal on line 88 from its corresponding generator 76 and produces a sequence of pulses representing points of equal magnitude between the reference signal on line 88 and the sampled signal on line 86. An exemplary set of comparisons is shown in the graph 90 for the output of the comparator 74A.

The graph 90 shows a sequence of pulse signals being produced sequentially in time. While the magnitude of the signal on line 86 is held constant by the sampler 66, the magnitude of the signal on line 88 is varying in time in accordance with the waveforms of FIG. 5. Thus, as the generator 76 produces the undulating waveform, as a function of time, the comparator 74 notes a sequence of points of the reference waveform on line 88, as a function of time, each of the points having an amplitude equal to that of the signal on line 86, the comparator noting this coincidence of amplitude by providing an output pulse as depicted in the graph 90. The set of output pulses produced by each of the comparators differs in view of the fact that each of the samplers 66 produces different values of voltage while each of the generators 76 is producing a different reference signal.

The output pulse trains from each of the comparators 74 are coupled to the AND gate 78 which, in turn, produces an output pulse which triggers the sampler 80 at the single combined coincidence in occurrence of a pulse of the comparator 74A with a pulse of the comparator 74B with a pulse of the comparator 74C. Thus, the sampler 80 is triggered at a point in time corresponding to the location of the scintillation.

The ramp generator 82 is driven by timing signals on line 92 while each of the generators 76 is driven by timing signals on line 94 from the timer 70. The ramp generator 82 produces a signal having a ramp waveform as depicted in graph D of FIG. 5, the ramp signal being coupled to the sampler 80. The timing signals on lines 92 and 94 operate the ramp generator 82 in synchronism with the reference generators 76 so that the inception of the ramp waveform coincides with the "start" points of the graphs A–C of FIG. 5. Upon being triggered by the gate 78, the sampler 80 samples the magnitude of the ramp waveform at the point in time corresponding to the location of the scintillation resulting in a magnitude of voltage of the ramp signal corresponding to the location of the scintillation. Thus, the output signal on line 22 of the sampler 80 is a voltage pulse having a magnitude corresponding to the location of the scintillation within the scintillator 28, this corresponding to the location of a point on the strip 31 of FIG. 1. An image point is provided on the display 22 at a location corresponding to the amplitude of the signal on line 22.

Each of the reference generators 76 is seen to comprise a sampler 96, a digital-to-analog converter 98, a memory 100 and a counter 102. In order to provide the reference waveform on line 88, the waveform is first stored in the memory 100 in digital format in the following manner. A point source of light (not shown) is moved along the front face of the scintillator 28 of FIG. 1, beginning on the left end of the scintillator 28, as viewed in FIG. 1, and terminating on the right end of the scintillator 28. The light source is moved in a stepwise fashion point by point along the face of the scintillator, the number of points being preferably two to three times the resolution obtainable with the camera 20. For example, the numerals 1–13 in FIG. 1 adjacent the front face of the scintillator 28 show thirteen of such points along the scintillator 28. In practice, however, several hundred points may be utilized. For greater accuracy in establishing the reference waveform for the generators 76, the scintillator 28 may be removed and the light source positioned within a plane passing through the region occupied by the scintillator and containing the line A—A of FIG. 1, the line A—A representing the depth within the scintillator 28 at which scintillation events are most likely to occur in response to incident gamma rays from the subject 27.

An alternative procedure for storing the reference waveform in the memory 100, in lieu of the aforementioned use of the moving light source, is the use of a moving aperture plate (not shown) placed at the front face of the scintillator 28. The aperture plate is opaque to gamma radiation or has a pinhole aperture for the passing of gamma radiation, the pinhole aperture being positioned sequentially at each of the positions referred to above for the sequence of positions for the light source. A source of radiation (not shown) is placed at a distance from and in front of the scintillator 28 so that substantially parallel rays of radiation are directed towards all parts of the scintillator 28. At each position of the pinhole aperture, a scintillation is produced in response to a quanta of gamma radiation propagating through the pinhole aperture. In response to observations of the scintillations by the photodetectors 30, the memories 100 store the samples of the reference waveforms. This alternative procedure has an advantage, namely, that the statistical generation of scintillation photons is preserved.

The switch 72 is utilized to operate the timer 70 in either the write mode or read mode, respectively, for writing data into the memories 100 or for reading data out of the memories 100. With reference to the generator 76C, by way of illustration, the switch 72 is operated to place the timer 70 in the write mode, the timer 70 then transmitting along line 94 and line 104, which branches out therefrom, a signal which places the memory 100 in the write mode. The timer 94 also transmits a signal along line 94 and line 106, which branches out therefrom, a signal which resets the counter 102 to zero. Thereupon, with each position of the aforementioned light source along the face of the scintillator 28, this description applying also to the pinhole aperture, a switch 108 is operated to strobe the timer 70 for the recording of one sample from the sampler 66C. In response to the strobing of the switch 108, the timer 70 transmits along line 94 a clock pulse signal to the sampler 96 to strobe the sampler 96 to sample a signal on line 86, the sampler 96 including an analog-to-digital converter 98 for converting the analog signal on line 86 to a digital number for storage in the memory 100. The timer 70 also transmits along line 94 a clock pulse to the counter 102 which, in response to the clock pulse, provides an address to the memory 100 of the location of the sample corresponding to the first position of the light source in front of the scintillator 28. When the light source is moved to the second position in front of the scintillator 28, the switch 108 is operated a second time to strobe the timer 70, the timer 70 then operating the sampler 96 and the counter 102 for placing a sample in the memory 100 representing the light received by a photodetector 30C in response to the second position of the light source. This procedure is continued until the values of light received by the photodetector 30C for each position of the light source are stored in the memory 100. It is noted that the line 94 from the timer 70 is coupled to all of the generators 76 so that, during the write mode, all of the generators 76 are storing their respective waveforms.

At the conclusion of the write mode, the switch 72 is operated to place the timer 70 in the read mode. Thereupon, the counter 102 is reset and the timer 70 provides clock pulses for operating the counter 102 to address the memory 100 sequentially to each of the stored samples, the stored samples being coupled from the memory 100 sequentially to the converter 98. The converter 98 converts the digital numbers from the memory 100 into the analog reference waveform on line 88, such as that shown by the graph 110 adjacent the reference generator 76C, this waveform having been shown previously in the graph C of FIG. 5.

The timer 70 is triggered by the occurrence of a signal from one or more of the photodetectors 30, two photodetector signals being utilized by way of example in FIG. 6, the two photodetector signals being coupled from the photodetectors 30B and 30C via the summer 68 and line 120 to the timer 70. Upon the detection of a scintillation by either, or both, of the photodetectors 30B and 30C, the photodetector signals on the lines 42 are summed together by the summer 68 to produce a pulse signal on line 120, the leading edge of the pulse signal serving to trigger the clock 70 to initiate the ramp waveform of the generator 82, to initiate the generation of the reference waveforms by the generators 76, and the sampling by the samplers 66. Upon completion of the time interval allotted by the timer 70 for the ramp waveform of the generator 82, the timer resets the generators 76 by setting the address counters 102 to zero, whereupon the timer 70 is ready to be triggered by another pulse on line 120.

The timer 70 synchronizes the display 26 with the computer 44 by timing signals on line 24, and also provides, via line 112, a signal for energizing a motor 114 of FIG. 4 for displacing the camera 20 in synchronism with an X coordinate voltage of the display 26. For ease of reference, a reference frame 116 having X and Y coordinate axes is shown in FIG. 4. The Y dimension is parallel to the strips 31 while the X dimension is transverse thereto. Rotation of the motor 114 is coupled via a worm gear 118 to the bracket 62 to produce a displacement of the camera 20 for imaging the next strip 31 of the subject 27.

A feature of the invention is a sensitivity of the camera 20 to the magnitudes of gamma ray energies impinging upon the scintillator 28. As has been noted hereinabove, the signals on the lines 42 have amplitudes corresponding to the amplitudes of the light energy impinging upon the photodetectors 30, the light energy, in turn, varying in accordance with the amplitude of the gamma ray energy. Thus, high energy gamma rays produce larger amplitude signal samples at the outputs of the samplers 66 than do low energy gamma rays. During the storing of the reference waveform in the memories 100 of the generators 76, a light source or gamma ray source having an intensity approximately equal to the intensities of the anticipated scintillations is utilized. In the event that the scintillations are very much brighter or very much weaker because of gamma ray energy outside the range of anticipated gamma ray energies, the aforementioned coincidences produced at the AND gate 78 do not occur with the result that scintillations due to gamma ray energy lying outside the anticipated range of gamma ray energies are not recorded on the display 22. Thus, the camera 22 automatically discriminates between gamma rays of differing energies in a manner analogous to that of pulse height analyzers, which are commonly used in radiographic work.

It is understood that the above described embodiment of the invention is illustrative only and that modifications thereof may occur to those skilled in the art. Accordingly, it is desired that this invention is not to be limited to the embodiments disclosed herein but is to be limited only as defined by the appended claims.

What is claimed is:

1. A radiographic camera comprising:
a scintillator positioned for viewing radiation signals from a subject;
a plurality of photodetectors positioned for viewing a common area of said scintillator and providing electrical signals in response to the scintillations from said scintillator;
means for masking scintillations of said scintillator, said masking means comprising a pair of masks spaced apart along an axis of said camera, said masking means being positioned between said scintillator and said plurality of photodetectors such that a scintillation of said scintillator casts a shadow of a portion of said masking means upon one of said photodetectors, said masking means having regions relatively opaque to said scintillations located in a predetermined arrangement with regions relatively transparent to said scintillations to provide said shadow with a predetermined format; and
means coupled to said photodetectors for producing an image of said subject from said detector signals, said image producing means including a source of reference signals having a format derived from said shadow format, said image producing means further comprising comparator means for comparing said electrical signals of said photodetectors with said reference signals to produce said image.

2. A camera according to claim 1 wherein each mask of said pair of masks has opaque regions located in a substantially similar arrangement.

3. A camera according to claim 2 wherein said opaque regions of each of said masks are arranged in the form of a series of parallel stripes.

4. A camera according to claim 3 wherein said parallel stripes of one of said masks are in registration with parallel stripes of the second of said masks, the spacings and widths of said stripes being monotonically decreasing in a direction transverse to said stripes.

5. A camera according to claim 1 wherein said image producing means comprises a plurality of comparators coupled to individual ones of said photodetectors for comparing the amplitudes of signals produced by individual ones of said photodetectors with the amplitude of a reference signal.

6. A camera according to claim 1 wherein said masking means comprises a pair of masks spaced apart along an axis of said camera, each of said masks casting substantially similar shadow patterns toward said photodetectors in response to a scintillation from said scintillator, said imaging producing means including means for comparing signals from individual ones of said photodetectors with said reference signal, said reference signal being temporally displaced for each comparison of said comparing means to provide separate sequences of comparison signals for each of said photodetectors, and means coupled to said comparing means for signalling a coincidence of a comparison in each of said comparison signal sequences of each of said photodetectors.

7. A radiographic camera comprising:
   a scintillator positioned for viewing radiation signals from a subject;
   a plurality of photodetectors positioned for viewing a common area of said scintillator and providing electrical signals in response to the scintillations from said scintillator;
   means for masking scintillations of said scintillator, said masking means being positioned between said scintillator and said plurality of photodetectors such that a scintillation of said scintillator casts a shadow of a portion of said masking means upon one of said photodetectors, said masking means having regions relatively opaque to said scintillations located in a predetermined arrangement with regions relatively transparent to said scintillations to provide said shadow with a predetermined format;
   means coupled to said photodetectors and including a source of reference signals having a format derived from said shadow format for producing an image of said subject from said detector signals, said image producing means comprising a plurality of comparators coupled to individual ones of said photodetectors for comparing the amplitudes of signals produced by individual ones of said photodetectors with the amplitude of a reference signal; and wherein
   said source of reference signals provides reference signals of similar form but displaced relative to each other in accordance with the relative locations of said photodetectors, each of said reference signals being coupled to corresponding ones of said comparators, each of said reference signals having an undulating waveform resulting in a plurality of comparison signals by each of said comparators in response to a single scintillation of said scintillator, said image producing means further comprising means for signaling a coincidence of comparison signals from each of said comparators.

8. A camera according to claim 7 wherein said image producing means further comprises a ramp waveform signal generator and means coupled to said coincidence signalling means for sampling a ramp signal of said ramp signal generating means to produce a coordinate of an image point, and means coupled to said ramp signal sampling means for displaying said image.

* * * * *